(12) United States Patent
Gao et al.

(10) Patent No.: US 12,386,873 B2
(45) Date of Patent: Aug. 12, 2025

(54) APPARATUS AND METHOD FOR SHARING AND PRUNING WEIGHTS FOR VISION AND LANGUAGE MODELS

(71) Applicant: SAMSUNG ELECTRONICS CO., LTD., Suwon-si (KR)

(72) Inventors: Shangqian Gao, Pittsburgh, PA (US); Burak Uzkent, Sunnyvale, CA (US); Yilin Shen, San Jose, CA (US); Hongxia Jin, San Jose, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/368,353

(22) Filed: Sep. 14, 2023

(65) Prior Publication Data
US 2024/0119077 A1    Apr. 11, 2024

Related U.S. Application Data

(60) Provisional application No. 63/410,789, filed on Sep. 28, 2022.

(51) Int. Cl.
*G06F 16/334* (2025.01)
*G06F 16/583* (2019.01)
*G06N 3/0985* (2023.01)

(52) U.S. Cl.
CPC ........ *G06F 16/334* (2019.01); *G06F 16/5846* (2019.01); *G06N 3/0985* (2023.01)

(58) Field of Classification Search
CPC .. G06F 16/334; G06F 16/5846; G06N 3/0985
(Continued)

(56) References Cited

U.S. PATENT DOCUMENTS 11,443,189 B2    9/2022  Chu et al.
11,475,254 B1 *  10/2022 Carvalho ........... G06Q 30/0201
(Continued)

FOREIGN PATENT DOCUMENTS

CN    111582456 A    8/2020
CN    111931901 A    11/2020
(Continued)

OTHER PUBLICATIONS

Sangho Lee et al., "Parameter Efficient Multimodal Transformers for Video Representation Learning", arXiv:2012.04124v2 [cs.CV], Sep. 22, 2021, 18 pages, [retrieved on Dec. 19, 2023], Retrieved from <https://arxiv.org/pdf/2012.04124v2.pdf>.
(Continued)

*Primary Examiner* — Cam Linh T Nguyen
(74) *Attorney, Agent, or Firm* — Sughrue Mion, PLLC

(57) ABSTRACT

A method of performing a multimodal tasks by using a multimodal model that includes a text encoder and a vision encoder, may include obtaining a text feature from the query via the text encoder; obtaining an image feature from the one or more input images via the vision encoder; and outputting a response to the query based on similarity between the text feature and the image feature, wherein weights vectors of the text encoder and the vision encoder are pruned and shared according to a sharing vector and a pruning vector that are generated by a hypernetwork, and wherein the hypernetwork and the multimodal model are jointly trained to minimize at least one of a difference between the weight vectors in the text encoder and the vision encoder, a difference between the weight vectors in different layers of the text encoder, and a number of parameters in the multimodal model.

20 Claims, 10 Drawing Sheets

(58) Field of Classification Search
USPC .......................................................... 707/748
See application file for complete search history.

(56) References Cited

U.S. PATENT DOCUMENTS

| | | | |
|---|---|---|---|
| 11,836,595 B1* | 12/2023 | Yang ..................... | G06N 3/082 |
| 2019/0197400 A1* | 6/2019 | Zhang .................... | G06F 16/35 |
| 2022/0138483 A1* | 5/2022 | Zhang .................... | G06V 20/63 |
| | | | 382/176 |
| 2022/0147838 A1 | 5/2022 | Gu et al. | |
| 2023/0076457 A1* | 3/2023 | Gao ........................ | G06N 3/04 |
| 2023/0084203 A1* | 3/2023 | Li ........................... | G06N 3/04 |
| | | | 706/25 |
| 2023/0196122 A1* | 6/2023 | Suh ......................... | G06N 5/01 |
| | | | 706/15 |

FOREIGN PATENT DOCUMENTS

| | | |
|---|---|---|
| CN | 113536015 A | 10/2021 |
| CN | 114492786 A | 5/2022 |
| CN | 114911979 A | 8/2022 |
| CN | 115310607 A | 11/2022 |

OTHER PUBLICATIONS

Keyu Wen et al., "Contrastive Cross-Modal Knowledge Sharing Pre-training for Vision-Language Representation Learning and Retrieval", arXiv:2207.000733v2 [cs.CV], Jul. 8, 2022, 14 pages, [retrieved on Dec. 19, 2023], Retrieved from <https://arxiv.org/pdf/2207.00733v2.pdf>.

Haoxuan You et al., "Learning Visual Representation from Modality-Shared Contrastive Language-Image Pre-training", arXiv:2207.12661v1 [cs.CV], Jul. 26, 2022, 23 pages, [retrieved on Dec. 19, 2023], Retrieved from <https://arxiv.org/pdf/2207.12661v1.pdf>.

International Search Report (PCT/ISA/210) and Written Opinion (PCT/ISA/237) issued by the International Searching Authority on Jan. 17, 2024 in corresponding International Application No. PCT/KR2023/014832.

Extended European Search Report issued on Jul. 2, 2025 by the European Patent Office in corresponding Application No. 23873115.2.

Haoxuan You et al: "Learning Visual Representation from Modality-Shared Contrastive Language-Image Pre-training", ARXIV.ORG, Cornell University Library, 201 Olin Library Cornell University Ithaca, NY 14853, Jul. 26, 2022 (Jul. 26, 2022), XP091280090, 22 pages.

Yi-Lin Sung et al: "VL-Adapter: Parameter-Efficient Transfer Learning for Vision-and-Language Tasks", ARXIV.ORG, Cornell University Library, 201 Olin Library Cornell University Ithaca, NY 14853, Mar. 24, 2022 (Mar. 24, 2022), XP091172376, 15 pages.

Ha David et al: "Hypernetworks", ArXiv, Dec. 1, 2016 (Dec. 1, 2016), pp. 1-29, XP093287898, Retrieved from the Internet: URL:https://arxiv.org/pdf/1609.09106 [retrieved on Jun. 18, 2025].

Shangqian Gao et al: "Model Compression via Hyper-Structure Network", Openreview.net, Sep. 28, 2020 (Sep. 28, 2020), XP093287961, Retrieved from the Internet: URL:https://openreview.net/references/pdf?id=XKueVyaSVn [retrieved on Jun. 18, 2025]; 17 pages.

Sangho Lee et al: "Parameter Efficient Multimodal Transformers for Video Representation Learning", ARXIV.ORG, Cornell University Library, 201 Olin Library Cornell University Ithaca, NY 14853, Sep. 22, 2021 (Sep. 22, 2021), XP091044944, 17 pages.

* cited by examiner

APPARATUS AND METHOD FOR SHARING AND PRUNING WEIGHTS FOR VISION AND LANGUAGE MODELS

CROSS-REFERENCE TO RELATED APPLICATION(S)

This application is based on and claims priority under 35 U.S.C. § 119 to U.S. Provisional Patent Application No. 63/410,789 filed on Sep. 28, 2022, in the U.S. Patent & Trademark Office, the disclosure of which is incorporated herein by reference in its entirety.

BACKGROUND

1. Field

The disclosure relates to an apparatus and a method for sharing and pruning weights for vision and language models, and particularly, relates to an apparatus and a method for reducing the network size of the vision and language models while preserving their prediction quality.

2. Description of Related Art

Extraction modules have seen growing interest in processing different modalities, including language and image data. However, the large number of parameters in extraction modules may pose challenges when deploying them on real-world applications, particularly on mobile devices. For instance, advanced vision and language models may have millions of parameters, making parameter reduction and size optimization crucial for their deployment on mobile devices and other resource-constrained environments.

Recent advancements in computer vision have shown that extraction module-based models may use architecturally similar models for cross-modal tasks involving both vision and language data. Such a setup naturally allows for weight sharing across different modalities.

Weight sharing offers the advantage of encouraging weight reuse, thereby reducing the number of parameters while preserving the model's capacity to some extent. However, existing weight sharing techniques have certain limitations because many of them rely on manually designed sharing rules that share an entire layer or block, which significantly restricts the flexibility of weight sharing. Due to the potential performance drop associated with reduced flexibility, there has been a growing demand for maximizing the utilization of model parameters.

SUMMARY

One or more embodiments of the present disclosure provide an electronic device for operating a multimodal model that includes a text encoder and a vision encoder, the electronic device including: a user interface configured to receive a query; and one or more processors configured to: obtain one or more input images; input the query to the text encoder to obtain a text feature; input the one or more input images to the vision encoder to obtain an image feature; and output a response to the query based on similarity between the text feature and the image feature, wherein weights vectors of the text encoder and the vision encoder are pruned and shared according to a sharing vector and a pruning vector that are generated by a hypernetwork to compress the multimodal model, and wherein the hypernetwork and the multimodal model are jointly trained to minimize at least one of a difference between the weight vectors in the text encoder and the vision encoder, a difference between the weight vectors in different layers of the text encoder, and a number of parameters in the multimodal model.

Any one or any combination of the one or more processors may be configured to: perform weight sharing and weight pruning on multi-head self-attention layers of the text encoder and the vision encoder.

The weight sharing may include either one or both of cross-modal weight sharing between the text encoder and the vision encoder, and block-wise sharing that is performed within a block including a plurality of layers of the text encoder.

Any one or any combination of the one or more processors may be configured to: perform weight sharing and weight pruning on feedforward network layers of the text encoder and the vision encoder.

The weight sharing may include either one or both of cross-modal weight sharing between the text encoder and the vision encoder, and block-wise sharing that is performed within a block including a plurality of layers of the text encoder.

Wherein the hypernetwork may be trained to generate the sharing vector and the pruning vector such that a same weight vector is not both pruned and shared.

When the weights vectors of the text encoder and the vision encoder are pruned and shared, weight sharing may be prioritized over weight pruning.

The hypernetwork and the multimodal model may be jointly trained by: after the weight vectors in the vision encoder and the text encoder are pruned and shared, freezing the weight vectors in the vision encoder and the text encoder, and then updating weights in the hypernetwork based on a comparison between an initial number of parameters in the multimodal model, and a number of parameters remaining in the multimodal model after weight sharing and weight pruning.

When the query requires identifying a target image from the one or more input images, any one or combination of the one or more processors may be further configured to: select an image having a greatest similarity with the text feature or having a similarity with the text feature that exceeds a predetermined similarity threshold, among the one or more input images, and provide the selected image as the response to the query.

When the query requires identifying a target object from a specific image among the one or more images, any one or combination of the one or more processors may be further configured to: identify an object having a greatest similarity with the text feature or having a similarity with the text feature that exceeds a predetermined similarity threshold, among the one or more input images, and visually indicate the identified object within the specific image, as the response to the query.

According to another aspect of the present disclosure, a method of performing a multimodal tasks by using a multimodal model that includes a text encoder and a vision encoder, may include: inputting a query to the text encoder to obtain a text feature from the query; inputting one or more input images to the vision encoder to obtain an image feature from the one or more input images; and outputting a response to the query based on similarity between the text feature and the image feature, wherein weights vectors of the text encoder and the vision encoder are pruned and shared according to a sharing vector and a pruning vector that are generated by a hypernetwork to compress the multimodal model, and wherein the hypernetwork and the multimodal model are jointly trained to minimize at least one of a difference between the weight vectors in the text encoder and the vision encoder, a difference between the weight vectors in different layers of the text encoder, and a number of parameters in the multimodal model.

The method may further include: performing weight sharing and weight pruning on multi-head self-attention layers of the vision encoder and the text encoder.

The weight sharing may include either one or both of cross-modal weight sharing between the text encoder and the vision encoder, and block-wise sharing that is performed within a block including a plurality of layers of the text encoder.

The method may further include: performing weight sharing and weight pruning on feedforward network layers of the vision encoder and the text encoder.

The weight sharing may include either one or both of cross-modal weight sharing between the text encoder and the vision encoder, and block-wise sharing that is performed within a block including a plurality of layers of the text encoder.

The hypernetwork may be trained to generate the sharing vector and the pruning vector such that a same weight vector is not both pruned and shared.

When the weights vectors of the text encoder are pruned and shared, weight sharing may be prioritized over weight pruning.

The hypernetwork and the multimodal model may be jointly trained by: after the weight vectors in the vision encoder and the text encoder are pruned and shared, freezing the weight vectors in the vision encoder and the text encoder, and then updating weights in the hypernetwork based on a comparison between an initial number of parameters in the multimodal model, and a number of parameters remaining in the multimodal model after weight sharing and weight pruning.

When the query requires identifying a target image from the one or more input images, the outputting of the response to the query may include: selecting an image having a greatest similarity with the text feature or having a similarity with the text feature that exceeds a predetermined similarity threshold, among the one or more input images, and providing the selected image as the response to the query.

When the query requires identifying a target object from a specific image among the one or more images, the outputting of the response to the query may include: identifying an object having a greatest similarity with the text feature or having a similarity with the text feature that exceeds a predetermined similarity threshold, among the one or more input images, and visually indicating the identified object within the specific image, as the response to the query.

According to another aspect of the present disclosure, there is provided a non-transitory computer-readable storage medium storing a program that is executable by at least one processor to perform a method of performing a multimodal tasks by using a multimodal model that comprises a text encoder and a vision encoder, the method including: obtaining a text feature from a query by inputting the query to the text encoder; obtaining an image feature from one or more input images by inputting the one or more input images to the vision encoder; and outputting a response to the query based on similarity between the text feature and the image feature, wherein weights vectors of the text encoder and the vision encoder are pruned and shared according to a sharing vector and a pruning vector that are generated by a hypernetwork to compress the multimodal model, and wherein the hypernetwork and the multimodal model are jointly trained to minimize at least one of a difference between the weight vectors in the text encoder and the vision encoder, a difference between the weight vectors in different layers of the text encoder, and a number of parameters in the multimodal model.

Additional aspects will be set forth in part in the description that follows and, in part, will be apparent from the description, or may be learned by practice of the presented embodiments of the disclosure.

BRIEF DESCRIPTION OF THE DRAWINGS

The above and other aspects, features, and aspects of embodiments of the disclosure will be more apparent from the following description taken in conjunction with the accompanying drawings, in which.

DETAILED DESCRIPTION

Figure 1:
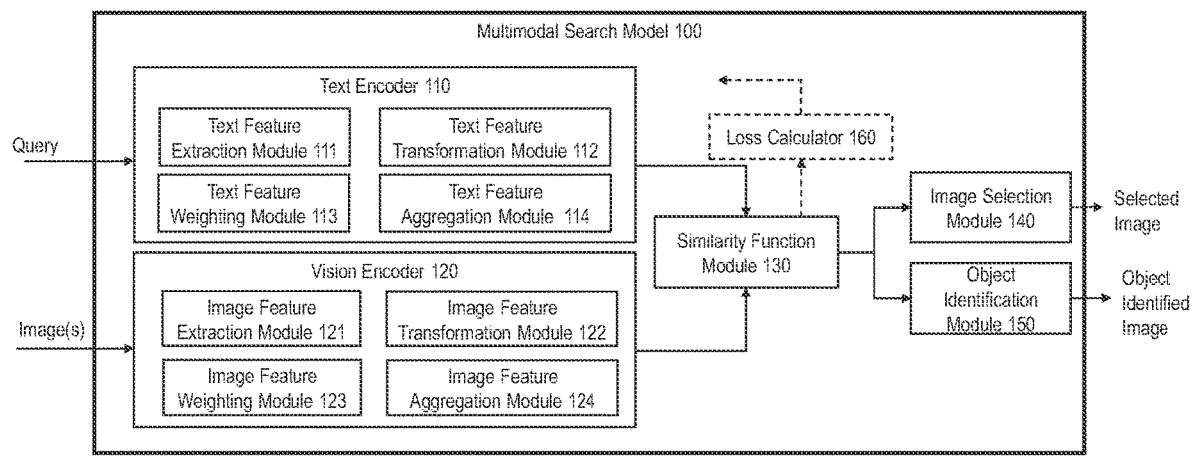
FIG. 1 is a diagram of an electronic device including a multimodal search model according to embodiments of the present disclosure.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

While such terms as "first," "second," etc., may be used to describe various elements, such elements must not be limited to the above terms. The above terms may be used only to distinguish one element from another.

The term "module" or "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

One or more embodiments of the present disclosure provide apparatuses and methods for maximizing the utilization of model parameters by integrating cross-modal weight sharing, block-wise cross-layer weight sharing, and weight pruning into a unified framework, in the field of neural networks and model compression. Weight sharing and pruning according to embodiments may operate at the level of a weight vector instead of an entire layer or block to enhance the flexibility of sharing and pruning operations.

Further, to eliminate the reliance on manually designed strategies, the apparatuses and methods according to embodiments adopt an end-to-end differentiable learning approach to determine the positions for sharing and pruning. This allows for automatic and optimized determination of the sharing and pruning points, without the need for explicit human intervention or predefined rules.

Further, one or more embodiments of the present disclosure provide apparatus and methods for generating a compact yet efficient multimodal model through selective weight sharing, weight pruning, and hypernetwork training, with a trade-off between the number of shared parameters and accuracy.

A hypernetwork may be trained to identify weight vectors for pruning or sharing. Rather than considering the entire layer, each weight vector may be treated as an individual element for pruning and sharing, to offer a denser search space. The hypernetwork may optimize the dense search space efficiently, enhancing the overall effectiveness of model size reduction.

According to embodiments of the disclosure, model compression may be achieved through three dimensions: cross-modal sharing, block-wise cross-layer sharing, and pruning. Weight sharing and pruning techniques may be applied to two core components of vision and text modules: multi-head self-attention and feed forward network. Cross-modal sharing may facilitate the sharing of corresponding weight vectors across vision and text extraction modules. Block-wise layer sharing splits the text extraction module into multiple blocks, enabling weight sharing across layers within the same block. Pruning is employed to eliminate weight vectors that are not used for sharing. By incorporating these three dimensions, selective weight sharing and pruning are preformed to strike a balance between shared parameters and accuracy.

According to embodiments of the disclosure, the joint training of model weights and the hypernetwork may be performed. During the joint training process, weight vectors may not be directly pruned or shared. Instead, a regularization term may be introduced to minimize the conflict between models before and after sharing and pruning. This soft alignment process significantly enhances the performance of the compressed model.

In an embodiment of the present disclosure, a method for model size reduction may include the following steps: training a hypernetwork, selective weight sharing and pruning, and a joint training of model weights and the hypernetwork.

At the step of training the hypernetwork, the hypernetwork is trained to identify weight vectors for pruning or sharing. Each weight vector may be treated as a distinct element in the search space.

At the step of selective weight sharing and pruning, weight sharing and pruning techniques may be applied to the multi-head self-attention and feed forward network components of vision and text model. Cross-modal sharing allows corresponding weight vectors to be shared across modalities, while block-wise cross-layer sharing enables weight sharing within specific blocks. Pruning eliminates weight vectors that are not used for sharing.

At the step of joint training of the model weights and the hypernetwork, the model weights and the hypernetwork are jointly trained via a soft alignment process that uses a regularization term to minimize the conflicts between the model before and after weight sharing and pruning.

Various embodiments of the present disclosure will be described in detail with reference to the drawings below.

FIG. 1 is a diagram of a computer system including a multimodal search model according to embodiments of the present disclosure.

The computer system may include one or more neural networks to use artificial intelligence (AI) technologies.

As shown in FIG. 1, the computer system may include a multimodal search model 100 configured to receive a query from a user input, and identify an image corresponding to the query, among a plurality of images that are retrieved from a data storage (e.g., a photo gallery of a mobile device or an external database) or that are received through an Internal search. When the query requests a retrieval of a specific image, the multimodal search model 100 may select candidate images corresponding to the query, from the plurality of images, rank the candidate images based on similarity between each of the candidate images and the query, and select one or more final images based on the ranking of the candidate images. When the query requests identification of a specific target object included in an image, the multimodal search model 100 may identify one or more candidate objects from an input image, rank the candidate objects based on similarity between each of the candidate objects and the query, select at least one final object based on the ranking of the candidate objects, and display a bounding box to show the selected final object.

The multimodal search model 100 may include a text encoder 110, a vision encoder 120, a similarity function module 130, an image selection module 140, and an object identification module 150. Additionally, the multimodal search model 100 may include a loss calculator 160 when an electronic device including the multimodal search model 100 updates the multimodal search model 100 based on on-device learning. The loss calculator 160 may be omitted if the electronic device uses the multimodal search model 100 as a pre-trained fixed model.

The text encoder 110 may receive a query via a touch screen, a keyboard, a microphone, and/or a communication interface. When the query is received through a voice signal, speech-to-text conversion may be performed on the voice signal to obtain text information corresponding to speech in the voice signal.

The text encoder 110 may include a text feature extraction module 111, a text feature transformation module 112, a text feature weighting module 113, and a text feature aggregation module 114.

The text feature extraction module 111 may extract text features (e.g., word features) from one or more words included in the query (e.g., a vector representing each of the words). For example, when a query stating "a woman is throwing a Frisbee in the park" is provided to the text feature extraction module 111, the text feature extraction module 111 may identify four words, "woman," "throwing," "Frisbee" and "park" in the query, and may extract a word feature from each of the words. The word features have content values that are vector values corresponding to contextual representation of words in the query. The text extraction module 111 may be embodied as a transformer, and in such a case, the text extraction module 111 may be incorporated into the text feature transformation module 122.

The text feature transformation module 122 may include a linear projection layer to project the word features to the joint embedding space to which both image features and the word features are projected. The projection layer may apply a word feature transform function which transforms word features of n words included in the query to the joint embedding space having a constant dimension.

The text feature weighting module 113 may provide a learnable weight function, which is optimized to assign higher weights to relatively more important words among the n words included in the query. The feature weighting module 113 may load a set of weights which are pre-stored in a memory, and may update the weights using the learnable weight function for the word features according to a loss calculated by the loss calculator 160.

The text feature aggregation module 114 may apply the weights to the transformed word features and the aggregated the weighted word features, for example, via mean pooling.

The vision encoder 120 may include an image feature extraction module 121, an image feature transformation module 122, an image feature weighting module 123, and an image feature aggregation module 124.

The image feature extraction module 121 may extract image features from an image, which capture spatial information (e.g., the appearance of objects and/or scenes) in the image. Content values of the image features may be calculated by detecting salient regions or grid cells in the image, mapping the detected salient regions or grid cells to a set of vectors, and averaging the set of vectors.

The spatial information may enable the vision encoder 120 to remove regions of the image including uninformative scenes or objects. The image feature extraction module 121 may be embodied as a transformer, or alternatively, embodied as a two-dimensional (2D) convolutional neural network (CNN), a R-CNN, a fast R-CNN, or a faster R-CNN. For example, when an image capturing a dog playing with a toy is provided to the image feature extraction module 121, the image feature extraction module 121 may identify a first image region of the dog and a second image region of the toy from the image, and may extract image features from each of the first image region and the second image region (e.g., a first vector representing the first region and a second vector representing the second region of the image). The extracted image features are fed into the image feature transformation module 122 and the image feature weighting module 123, respectively. When the image feature extraction module 121 is embodied as a transformer, the image feature extraction module 121 may be incorporated into the image feature transformation module 122.

The image feature transformation module 122 may include a linear projection layer to project the image features to the joint embedding space where semantically similar feature points in different modalities (i.e., image and text) are placed closer to each other in distance. The projection layer may apply an image feature transform function which transforms image features of regions of the image to the joint embedding space.

The image feature weighting module 123 may provide a learnable weight function, which is optimized to assign higher weights to important regions of the image. The image feature weighting module 123 may load a set of weights which are pre-stored in a memory, and may update the weights using the learnable weight function for the image features according to a loss calculated by the loss calculator 160.

The image feature aggregation module 124 may apply the weights to the transformed image features and the aggregated the weighted image features, for example, via mean pooling.

During a training process, the similarity function module 130 may compute a similarity score of a matching query-image pair and similarity scores of non-matching query-image pairs. For example, a cosine similarity or a negative Euclidean distance may be computed as a similarity score.

The loss calculator 160 may compute a triplet loss based on the similarity score of the matching query-image pair and the similarity scores of non-matching query-image pairs. The non-matching query feature and the non-matching image feature may be randomly selected to generate random negative non-matching samples for the purposes of training. The triplet loss may be back-propagated to the vision encoder 120 and the text encoder 110 so that the image feature weighting module 123 and the text feature weighting module 113 may update the weights for the image features and the weights for the word features, respectively, to minimize or converge the triplet loss. The triplet loss may be determined to be minimized or converged when the triplet loss has reached a predetermined minimum value, or a constant value with a preset margin. The vision encoder 120 and the text encoder 110 may be jointly trained based on the triple loss.

In an inference phase, the similarity function module 130 may compute a similarity score between an input query and each of a plurality of input images, and may provide the similarity scores to the image selection module 140 or the object identification module 150, depending on a task given according to the input query.

When the query requests retrieval of a specific image, the image selection module 140 may rank the input images based on the similarity scores and may select candidate images based on the ranking. For example, a preset percentage (e.g., top 10% or 20% images) or a preset number of images (e.g., 4 images having the highest similarity scores) may be selected from the plurality of input images based on the ranking. Alternatively, or combined with the usage of the ranking, a predetermined similarity threshold may be applied to select candidate images. For example, any image having a similarity score that is higher than the predetermined similarity threshold may be selected as a final image, or among the images selected based on the ranking, the images having a similarity score that is higher than the predetermined similarity threshold are selected as finals images.

When the query requests identification of a specific target object from a given image, the object identification module 150 may identify one or more candidate objects from the given image, rank the candidate objects based on similarity between each of the candidate objects and the query, select at least one final object based on the ranking of the candidate objects, and display a bounding box (or another visual indicator) to show the selected final object as a response to the input query.

Figure 2:
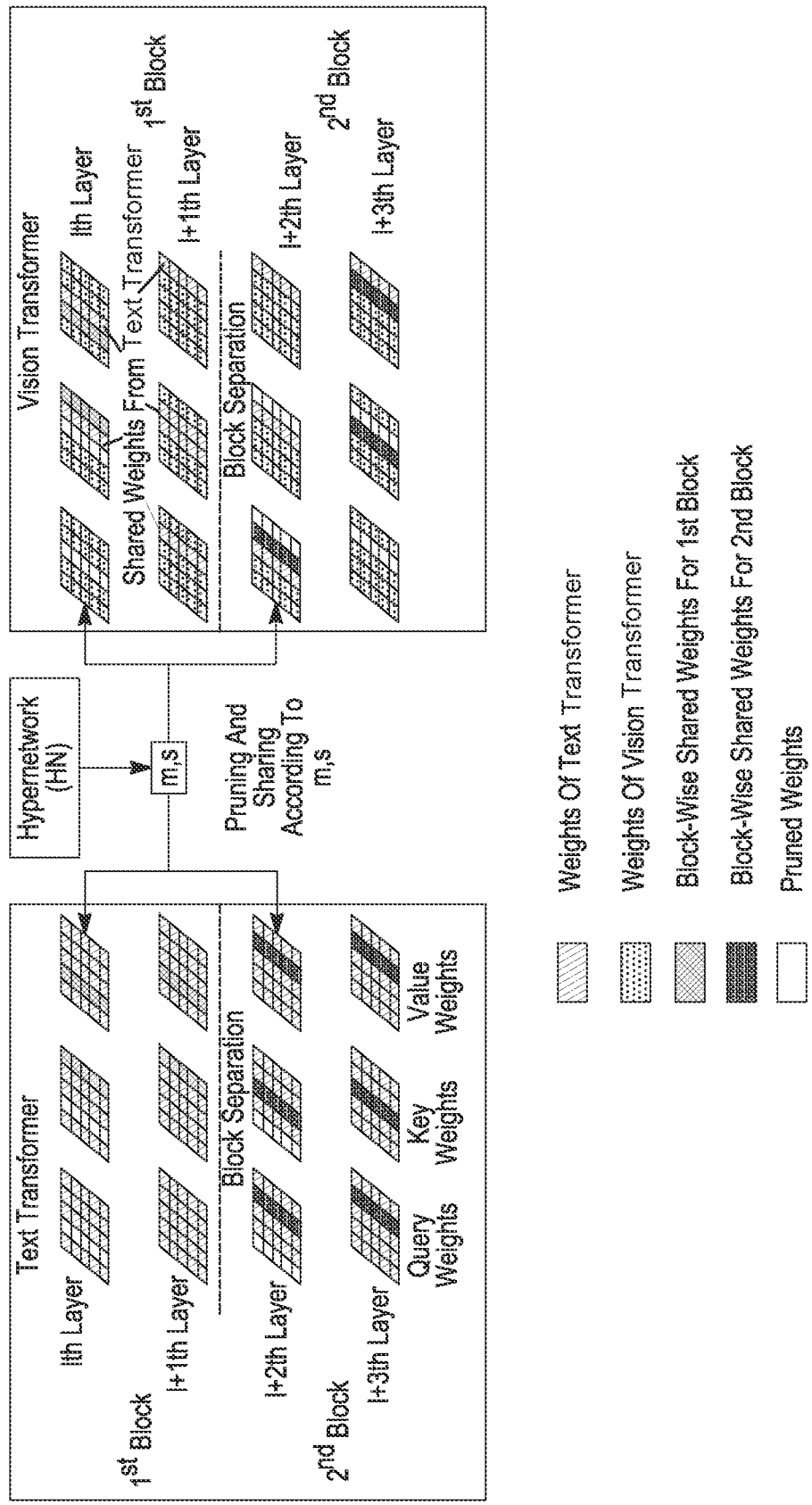
FIG. 2 is a diagram illustrating a method of performing weight pruning and sharing between a text model and a vision model according to embodiments of the present disclosure.

FIG. 2 is a diagram illustrating a method for performing weight pruning and sharing between a text transformer and a vision transformer, in accordance with embodiments of the present disclosure. The text transformer and the vision transformer shown in FIG. 2 may correspond to the text feature transformation module 112 and the image feature transformation module 122, respectively, as presented in FIG. 1. The text transformer may include a plurality of layers that constitute a neural network, and the plurality of layers may be grouped into a plurality of blocks. Similarly, the vision transformer may include a plurality of layers that constitute another neural network, and the plurality of layers of the vision encoder 120 may be grouped into a plurality of blocks.

To facilitate description, the weight pruning and sharing, as per the embodiments of the present disclosure, are described to be applied to a text transformer and a vision transformer with reference to FIG. 2. However, the weight pruning and sharing may be applied to any other elements within the text encoder 110 and the vision encoder 120, such as a pair of the text feature extraction module 111 and the image feature extraction module 121, and a pair of the text feature weighing module 113 and the image feature weighting module 123.

Referring to FIG. 2, weight pruning and sharing may be performed between the text transformer and the vision transformer using a hypernetwork. The hypernetwork may generate a sharing vector s and a pruning vector m, so that the text transformer shares its weights with the transformer based on the sharing vector s, and the text transformer and the vision transformer prune their weights according to the pruning vector m.

Each of the text transformer and the vision transformer may include a Multi-Head Attention (MSA) layer and a Feed-Forward Network (FFN) layer. Since MSA and FFN layers contain a significant portion of the weights in the multimodal search model 100, they may be the primary targets for structural weight sharing and pruning. To determine which node weights should be pruned or shared, the sharing vector s and the pruning vector m generated by the hypernetwork are optimized during a pre-training phase. This optimization process enhances the efficiency of weight utilization and improves model performance. Moreover, to enhance the flexibility of the pruning and sharing process, block-wise across-layer sharing is applied within each block of the text transformer. This technique allows for better adaptability and fine-grained control over the weight pruning and sharing mechanism within the multimodal search model 100.

The text transformer t and the vision transformer v may have the same or substantially the same structure. $W^{*l*} \in \{v, t\}$ may be used to express a weight matrix $W^{tl}$ of an $l^{th}$ layer of the text transformer t and a weight matrix $W^{vl}$ of an $l^{th}$ layer of the vision transformer v, when each of the text transformer and the vision transformer includes L layers in total, and $l=1, \ldots, L$. The text transformer may include a plurality of layers that constitute a neural network, and the plurality of layers may be grouped into a plurality of blocks. Similarly, the vision transformer may include a plurality of layers that constitute another neural network, and the plurality of layers of the vision transformer may be grouped into a plurality of blocks.

For the text transformer t and the vision transformer v, there are three weight matrixes for query $W^*_q \in R^{d \times d}$, key $W^*_k \in R^{d \times d}$, and value $W^*_v \in R^{d \times d}$, wherein $* \in \{v, t\}$, d is an embedding dimension, N* represents the number of tokens given the modality. With input tokens, the final Q*, K*, and V* for self-attention is obtained by:

$$Q^* = X^* W^*_q, K^* = X^* W^*_k, V^* = X^* W^*_v \qquad \text{Equation (1)}$$

In order to make minimal changes to the original multimodal search model 100, pruning may be performed on only the two weight matrixes for query $W^*_q$ and key $W^*_k$, and structural sharing may be applied to all three weight matrixes for query $W^*_q$, key $W^*_k$, value $W^*_v$ between the text transformer t and the vision transformer v and across layers with each block of the text transformer t. However, the embodiments of the present disclosure are not limited thereto, and pruning may be applied to any one or any combination of the weight matrixes for query $W^*_q$, key $W^*_k$, value $W^*_v$.

More specifically, for pruning, a binary vector $m^* \in \{0, 1\}^d$ may be applied to the weight matrixes for query $W^*_q$ and key $W^*_k$. When the pruning is applied to the vision transformer, the production of the query $Q^{vl}$ and the key $K^{vl}$ is expressed as follows:

$$Q^{vl}(K^{vl})^T = X^{vl}(W_q^{vl} \odot m^{vl})(W^{vl} \odot m^{vl})^T (X^{vl})^T \qquad \text{Equation (2)}$$

Where $m^{vl}$ is resized to have the same dimension as $W_q^{vl}$ at an initial stage, $\odot$ is the element-wise production, and Xvi is a feature map from a previous layer.

The hypernetwork may generate the sharing vector $s^* \in \{0, 1\}^d$ to perform cross-modal weight sharing between the text transformer and the vision transformer, and also to preform cross-layer weight sharing between different layers of the text transformer within each block of the text transformer. For the sharing, weights of the text transformer may be used to be shared with the vision transformer. As a result, a weight vector may be used in different layers across the text transformer and the vision transformer.

Through cross-modal sharing, the weight matrix for query $W_q^v$ in the vision transformer may be obtained as follows:

$$W_q^{vl} = s^l \odot W_q^{vl} + (1-s^l) \odot W_q^{vl} \quad \text{Equation (3)}$$

where $s^l$ is first expanded to have the same size as $W_q^{vl}$, and weight vectors of index i with $s_i^l = 0$ are shared.

Through block-wise cross-layer sharing, the weight matrix for query $W_q^t$ in the text transformer may be obtained as follows:

$$W_q^{tl} = s^{tl} \odot W_q^{tl} + (1-s^{tl}) \odot W_q^{vb} \quad \text{Equation (4)}$$

Where $W_q^{tl}$ represents the weights of l-th layer in the text transformer, $W_q^{tb}$ represents assigned base weights, and $s^{tl}$ is a sharing vector for cross-layer sharing. As a result, the final weights for the text transformer are divided into two parts: layer-specific weights and shared weights from base layers.

In an embodiment of the present disclosure, for block-wise cross-layer sharing, weights from a certain layer may be used as base weights for all other layers.

In other embodiments of the present disclosure, the text transformer may be divided into a plurality of blocks, and each block includes a plurality of layers and has its own base weights in order to enhance the flexibility of cross-layer sharing. Specifically, a set of base layers may be established as follows: $B = \{b_1, b_2, \ldots, b_{|B|}\}$. All layers of the text transformer may be split into a plurality of blocks based on base layers so that an n-th block contains layers with $b_n \leq l < b_{n+1}$. For example, weights of the first layer in each block may be set to base weights. When l is a base layer ($l \in B$), $s^{tl}$ may be set to 1 by assigning the base layer its own weights, and the weights of the base layer may be for the other layers in the same block.

After block-wise cross-layer sharing, the base weights for cross-modal sharing may be also changed. When both block-wise cross-layer sharing and cross-modal sharing are applied, the final weight $W_q^{vl}$ of the vision transformer may be expressed as follows:

$$W_q^{vl} = s^l \odot W_q^{vl} + (1-s^l)s^{tl} \odot W_q^{tl} + (1-s^l)(1-s^{tl}) \odot W_q^{tb} \quad \text{Equation (5)}$$

As shown above, the final weights $W_q^{vl}$ of the vision transformer may include weights from the text transformer of the same layer ($W_q^{tl}$), weights from the text transformer of the base layer ($W_q^{tb}$), in addition to vision transformer specific weights ($W_q^{vi}$).

The block-wise cross-layer sharing and cross-modal sharing may be applied to FFN layers and MSA layers of the text transformer and the vision transformer.

According to embodiments of the present disclosure, a restriction may be applied to the cross-modal sharing and pruning to address conflicts between the pruning vector m and the sharing vector s. For example, when the same weights are instructed to be pruned and shared based on the pruning vector m and the sharing vector s, the meaningless act of sharing of the pruned weights would occur. To resolve the conflicts between the pruning vector m and the sharing vector s, the following restriction may be applied to the cross-modal sharing and pruning:

$$(m_i^{vl}, s_i^l) \in C, (m_i^{tl}, s_i^l) \in C, \text{ where } \{(x,y)|(x, y) \neq (0, 0)\} \quad \text{Equation (6)}$$

Where i denotes an index of sharing or pruning for a certain weight vector. If $(m_i, s_i) \in C$, the text transformer and the vision transformer do not share and prune the same weight vector.

For the cross-layer sharing and pruning for the text transformer, the following restriction may be applied to resolve the conflict between sharing vector s and the pruning vector m as follows:

$$(m_i^{tl}, s_i^{tl}) \in C, \text{ where } \{(x,y)|(x, y) \neq (0, 0)\}, l \notin B$$

$$(m_i^{tl}, s_i^{tl} s_i^{tl+1} \ldots s_i^{tb'}) \in C, \text{ where } \{(x,y)|(x, y) \neq (0, 0)\}, l \notin B \quad \text{Equation (7)}$$

Where b' represents the last element of the current block. For example, if $l = b_1$, the current block consists of layers $b_1 \leq l < b_2$, and $b' = b_2 - 1$. $s_i^{tl} s_i^{tl+1} \ldots s_i^{tb'}$ represent all the shared elements from different layers in the current block, and these shared elements may be kept in the base layer. This restriction may not be applied between $s_i^l$ and $s_i^{tl}$ because conflict may not occur between sharing.

For example, when the pruning vector and the sharing vector are zero ($m_i^{tl} = s_i^l = 0$), the sharing vector $s_i$ is prioritized over the pruning vector $m_i$ by setting the pruning vector $m_i$ to 1, so that shared weights are not allowed to be pruned in compliance with the restriction in Equation (6). Sharing weights may be prioritized over pruning weights to preserve the model capacity through sharing.

In order to generate the pruning vector m and the sharing vector s, the hypernetwork may be parameterized by θ and Gumbel-Sigmoid technique as follows:

$$m, s = HN(z, \theta) \quad \text{Equation (8)}$$

Where z is a predetermined vector that is used as an input of the hypernetwork. For example, z may be a random noise sampled from Gaussian distribution. The hypernetwork may include gated recurrent units (GRUs) configured to capture inter-layer interactions, and multilayer perceptrons (MLPs) that are used as intra-layer interactions. The hypernetwork is trained to solve the following optimization problem:

$$\min_\theta \mathcal{L}_{pre-training}(x, y; m, s) + \lambda \mathcal{R}(P(m, s), pP_{total}) \quad \text{Equation (9)}$$

The first part of Equation (9) represents a pre-training task loss for a cross-modal pre-training task. The second part of Equation (9) represents a parameter regularization which pushes the number of parameters to a predetermined threshold p.

In Equation (9), x is an input sample of an image and text pair, y is a label (ground-truth) of the input sample, and $\mathcal{L}_{pre-training}$ is an original pre-training loss of a multimodal model (e.g., MDETR and GLIP), having a model structure decided by m and s. $\mathcal{R}(P(m,s), pP_{total})$ denotes a regularization loss that controls the amount of parameters that the model should keep, given $p \in (0, 1]$. λ denotes a control parameter that controls the strength of the regularization. P(m, s) in the regularization loss represents the remaining number of parameters decided to keep by m and s, and $P_{total}$ denotes a total number of parameters in the MSA and FFN layers of the text and vision transformers. $\mathcal{R}$ may be a regression loss function, such as mean squared error (MSE) or mean absolute error (MAE). For weight sharing and pruning, m and s derived from the hypernetwork may be directly applied onto the vision and text transformers. To address the issue of a possible reduction of accuracy due to significant alterations in the outputs of the vision and text transformers, a selection-based regularization mechanism may be applied to gently push selected weights closer to each other for sharing, or push them to zero for pruning, as follows:

$$\mathcal{R}_\omega(W,m,s)=\Sigma\|(1-s)\odot W^t-(1-s)\odot W^v\|_1+\Sigma\|(1-s^{t_l})$$
$$\odot W^{t_l}-(1-s^{t_l})\odot W^{t_b}\|_1+\Sigma m_{1-i'}\|W_{[:,1-i]}\|_2 \quad \text{Equation (10)}$$

Where the first term (i.e., $\Sigma\|(1-s)\odot W^t-(1-s)\odot W^v\|_1$ pushes the selected weight vectors closer to reduce the differences between text transformer weights and vision transformer weights, the second term (i.e., $\Sigma\|(1-s^{t_l})\odot W^{t_l}-(1-s^{t_l})\odot W^{t_b}\|_1$ pushes the selected weight vectors closer to reduce the differences between different layers in the same block, and the third term (i.e., $\Sigma m_{1-i'}\|W_{[:,1-i]}\|_2$) penalizes weights that are pruned by the pruning vector m, by pushing the pruned weights to be close to 0. With this regularization term, the weights of the multimodal model are aligned to the pruning and sharing vectors m and s, which create a smooth process for reducing the number of model parameters.

Given the regularization loss, model weights W are learned by optimizing the following objective function:

$$\min_W \mathcal{L}_{pre-training}(x, y; W) + \gamma \mathcal{R}_\omega(W, m, s) \quad \text{Equation (11)}$$

The first part of Equation (11) represents a pre-training task loss for a cross-modal pre-training task, where x and y are input samples and labels, and W denotes multimodal model weights. The second part of Equation (11) represents a regularization loss used for aligning the multimodal model weights W before and after fine-tuning. In Equation (11), $\gamma$ denotes a control parameter that controls the strength of $\mathcal{R}_\omega(W, m, s)$. After the pre-training process, the corresponding weights are pruned and shared to compress the multimodal model. The compressed multimodal model can be then used for fine-tuning on downstream tasks.

The training process of the hypernetwork and the multimodal model may be performed using Algorithm 1 presented below:

---

Algorithm 1: Learning to Jointly Share and Prune Weights for Grounding Based Vision and Language Tasks

---

Input: the pre-training dataset and a sub-dataset for learning structure vectors; D, $D_{sub}$: remained rate of parameters: p; hyper-parameter: $\lambda$, $\gamma$: pre-training epochs: E; the model for pre-training: f; the hypernetwork HN parameterized by $\theta$
for e:= 1 to E do
| /* Optimizing model weights.      Freeze $\theta$ in HN         */
| for a mini-batch (x, y) in D do
| | 1. generate m, s from HN with Eq. 8.
| | 2. apply constraints on m, s defined in Eq. 6 and Eq. 7, and sharing is prioritized.
| | 3. calculate $R_w$ (W, m, s) given W and m, s.
| | 4. calculate gradients w.r.t W by minizing Obj. 11 and update W.
| end
| /* Optimizing HN weights.      Freeze W in the model.         */
| for a mini-batch (x, y) in $D_{sub}$ do
| | 1. generate m, s from HN with Eq. 8.
| | 2. apply constraints on m, s defined in Eq. 6 and Eq. 7, and sharing is prioritized.
| | 3. calculate the parameter regularization term R(P(m, s), $pP_{total}$).
| | 4. calculate gradients w.r.t $\theta$ by minizing Obj. 9 and update $\theta$.
| | end
end
Get f' by pruning and sharing f based on m, s. Return f' for task-specific fine-tuning.

---

As per Algorithm 1, during the training of the hypernetwork, the pruning and sharing vectors m and s are applied in a forward calculation. However, when optimizing the multimodal model, the forward calculation remains unchanged. In order to reduce the training time of the hypernetwork, a smaller subset, $D_{sub}$, of the pre-training dataset D can be employed. The hypernetwork serves the purpose of accelerating the learning of the pruning and sharing vectors m and s. Additionally, the hypernetwork aids in capturing the complicated interaction between pruning and sharing across modalities and layers. While it is possible to directly set the pruning and sharing vectors m and s as learning parameters, doing so might lead to a deceleration in the learning process. Consequently, this could potentially diminish the ultimate performance of the multimodal model.

Figure 3:
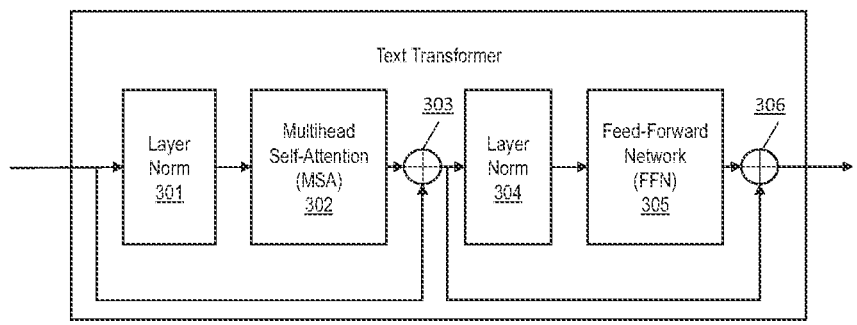
FIG. 3 illustrates a text transformer and a vision transformer according to embodiments of the present disclosure.
Figure 3:
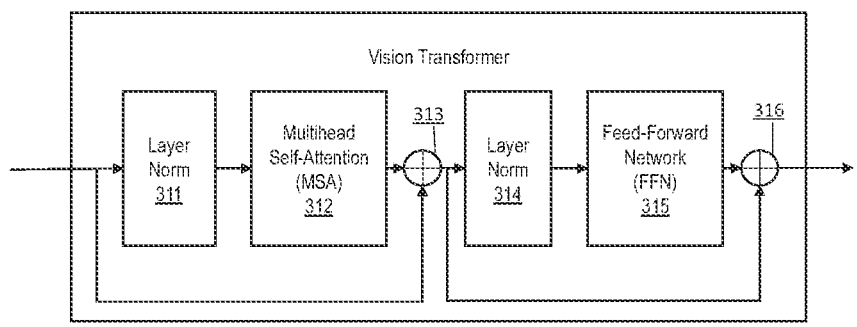

FIG. 3 illustrates a text transformer and a vision transformer according to embodiments of the present disclosure.

The text transformer may include a normalization layer 301 configured to normalize input text features, a multi-head self-attention (MSA) layer 302 configured to capture relationships between different words in an input sequence, an adder 303 configured to add the normalized text features and the self-attention output, another normalization layer 304 configured to normalize the addition of the normalized text features and the self-attention output, and a feed-forward neural network (FFN) layer 305 configured to apply non-linear transformations to the self-attention output, and another adder 306 configured to add the output of the FFN layer 305 to the addition of the normalized text features and the self-attention output.

The vision transformer may have the same or substantially the same structure as the text transformer. The vision transformer may include a normalization layer 311 configured to normalize input image features, a multi-head self-attention (MSA) layer 312 configured to capture relationships between different image features in an input sequence, an adder 313 configured to add the normalized image features and the self-attention output, another normalization layer 314 configured to normalize the addition of the normalized image features and the self-attention output, and a feed-forward neural network (FFN) layer 315 configured to apply non-linear transformations to the self-attention output, and another adder 316 configured to add the output of the FFN layer 315 to the addition of the normalized image features and the self-attention output.

Figure 4A:
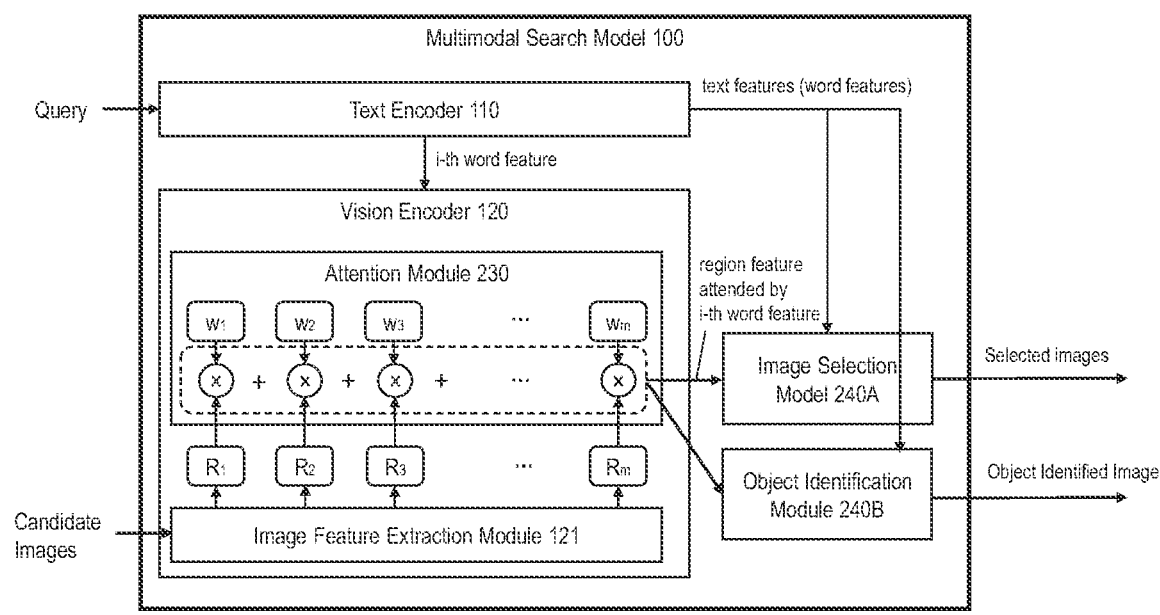
FIG. 4A is a diagram of a multimodal search model that performs a task of detecting an object from an input image, and a task of selecting one or more images from a plurality of input images, depending on an input query, according to embodiments of the present disclosure.

FIG. 4A is a diagram of a multimodal search model that performs a task of detecting an object from an input image, and a task of selecting one or more images from a plurality of input images, depending on an input query, according to embodiments of the present disclosure.

As shown in FIG. 2, the multimodal search model 100 may receive a second query which requests retrieval of one or more images that match description in the query, among a plurality of input images.

The text encoder 110 may identify words included in the query, and may extract a word feature (e.g., a vector representing the word feature) from each of the words. When there are n words in the query, the text encoder 110 may extract a first word feature, a second word feature, . . . , and an n-th word feature.

The vision encoder 120 may identify regions of objects or scenes from a candidate image, and may extract region features $R_1$, $R_2$, $R_3$, . . . $R_m$ from the identified regions, via the image feature extraction module 121.

The attention module 230 may determine weights $w_1$, $w_2$, $w_3$, . . . $w_m$ which respectively correspond to the region features $R_1$, $R_2$, $R_3$, . . . $R_m$ of a candidate image for an i-th word feature, wherein i∈1, 2, . . . , and n. The attention module 230 may apply the weights $w_1$, $w_2$, $w_3$, . . . $w_m$ to the region features $R_1$, $R_2$, $R_3$, . . . , $R_m$, respectively, and add the weighted region features $w_1R_1$, $w_2R_2$, $w_3R_3$, . . . , $w_mR_m$ to obtain an aggregated region feature value. The aggregated region feature value is fed into the image selection module 240A as a region feature attended by the i-th word feature.

For example, when there are three word features extracted from three words of the query, the attention module 230 may compute (1) a first set of weights $w_{12}, w_{13}, \ldots w_{1m}$ that correspond to the region features $R_1, R_2, R_3, \ldots R_m$ of a first candidate image, for the first word feature (2) a second set of weights $w_{21}, w_{22}, w_{23}, \ldots w_{2m}$ that correspond to the region features $R_1, R_2, R_3, \ldots R_m$ of the first candidate image, for the second word feature, and (3) a third set of weights $w_{31}, w_{32}, w_{33}, \ldots w_{3m}$ that correspond to the region features $R_1, R_2, R_3, \ldots R_m$ of the first candidate image, for the third word feature. The attention module 230 may apply the first set of weights with $w_{12}, w_{13}, \ldots w_1m$ to the region features $R_1, R_2, R_3, \ldots, R_m$, respectively, and may add the weighted region features $w_{11}R_1, w_{12}R_2, w_{13}R_3, \ldots, w_{1m}R_m$ to obtain a first aggregated region feature value for the first word feature. The attention module 230 may apply the second set of weights $w_{21}, w_{22}, w_{23}, \ldots w_{2m}$ to the region features $R_1, R_2, R_3, \ldots R_m$, respectively, and may add the weighted region features $w_{21}R_1, w_{22}R_2, w_{23}R_3, \ldots, w_{2m}R_m$ to obtain a second aggregated region feature value for the second word feature. The attention module 230 may apply the third set of weights $w_{31}, w_{32}, w_{33}, \ldots w_{3m}$ to the region features $R_1, R_2, R_3, \ldots, R_m$, respectively, and may add the weighted region features $w_{31}R_1, w_{32}R_2, w_{33}R_3, \ldots, w_{3m}R_m$ to obtain a third aggregated region feature value for the third word feature.

The image selection module 240A may compute a similarity score (e.g., a cosine similarity or a negative Euclidean distance) between a region feature and a query feature. In particular, the image selection module 240A may use a normalized similarity function to compute a similarity score for each word feature, and may apply mean aggregation the similarity scores to obtain a final image-query similarity score. The final image-query similarity score may be also referred to as "attended similarity score."

For example, the image selection module 240A may compute a first similarity score between the first aggregated region feature and the first word feature, a second similarity score between the second aggregated region feature and the second word feature, and a third similarity score between the third aggregated region feature and the third word feature, and may compute a weighted sum or an average of the first similarity score, second similarity score, and the third similarity score as the final image-query similarity score.

The image selection module 240A may rank the candidate images based on the final image-query similarity scores of the candidate images, and may select at least one image based on the ranking of the candidate images. For example, a preset percentage (e.g., top 10% or 20% images) or a preset number of images (e.g., 100 images having the highest similarity scores) may be selected from the candidate images based on the ranking, and may be presented to the user in the order of the ranking. Alternatively, or combined with the usage of the ranking, a predetermined similarity threshold may be applied to select candidate images. For example, any candidate image having a similarity score that is higher than the predetermined similarity threshold may be selected, or among the candidate images selected based on the ranking, only the images having a similarity score that is higher than the predetermined similarity threshold are selected as a response to the query.

The multimodal search model 100 may receive another query which requests identification of a target object from an input image. In such a case, the text feature and region feature may be input to the object identification module 240B. The object identification module 240B may compute similarity scores between a plurality of objects detected from an input image, and the text features acquired from the input query, and identify an object which has the highest similar score with the input query as a response to the query.

Figure 4B:
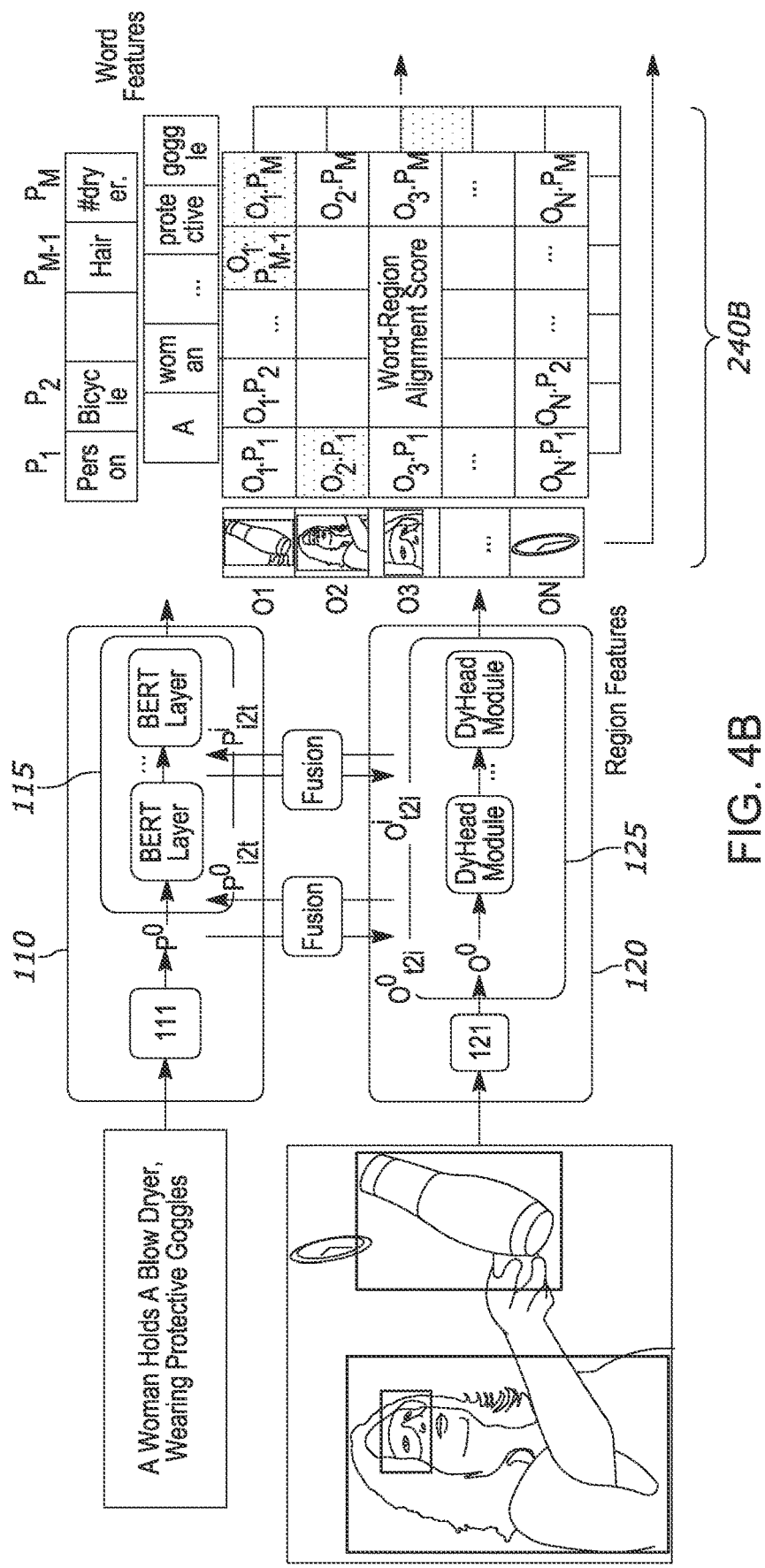
FIG. 4B is a diagram illustrating an example multimodal task for identifying target objects in response to an input query, according to embodiments of the present disclosure.

FIG. 4B is a diagram illustrating an example multimodal task for identifying target objects in response to an input query, according to embodiments of the present disclosure. The model weights of the text encoder 110 and the vision encoder 120 shown in FIG. 4B are compressed using the hypernetwork as described with reference to FIG. 2.

As shown in FIG. 4B, a user query (e.g., "a woman holds a blow dryer, wearing protective goggles) is input into the text encoder 110, and an image is input to the vision encoder 120. The text encoder 110 processes the user query to acquire word features $P_1, P_2, \ldots P_M$ via the text feature extraction module 111 and a plurality of BERT layers 115, which embody the text feature transformation module 112 (and the text feature weighting module 113, and the text feature aggregation module 114).

The vision encoder 120 processes the input image to acquire image region features $O_1, O_2, \ldots O_N$, via the image feature extraction module 121 and a plurality of dynamic head (DyHead) modules 125, which embody the image feature transformation module 122 (and the image feature weighting module 123 and the image feature aggregation module 124).

The object identification module 240B may compute similarity scores (also referred to as "alignment scores) between word features $P_1, P_2, \ldots P_M$, and image region features $O_1, O_2, \ldots O_N$, and may identify objects corresponding to "woman," "blow dryer," and "protective goggles" from the input image, based on the similarity scores.

Figure 5:
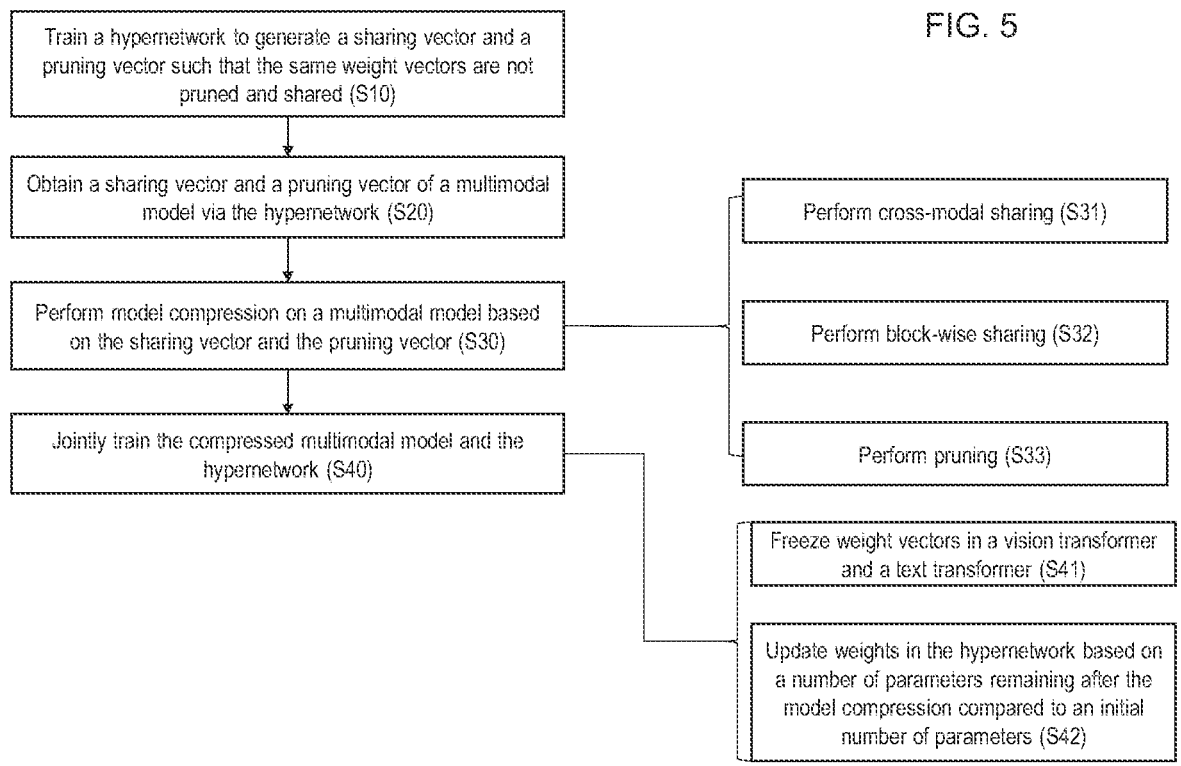
FIG. 5 is a flowchart illustrating a method of performing weight pruning and sharing between a text model and a vision model according to embodiments of the present disclosure.

FIG. 5 is a flowchart illustrating a method of performing weight pruning and sharing between a text encoder and a vision encoder according to embodiments of the present disclosure.

In operation S10, a hypernetwork is pre-trained to generate a sharing vector and a pruning vector such that both pruning and sharing are not applied to the same weight vectors.

In operation S20, a sharing vector and a pruning vector are obtained from the pre-trained hypernetwork.

In operation S30, a multimodal model is compressed based on the sharing vector and the pruning vector. Operation S30 may include cross-modal sharing S31, block-wise cross-layer sharing S32, and pruning S33. In detail, the cross-modal sharing is performed between a text transformer and a vision transformer of the multimodal model, in operation S31, for example, using Equation (3). The block-wise cross-layer sharing is performed on the text transformer in operation S32, for example, using Equation (4). The pruning is performed on the vision transformer in operation S33, for example, using Equation (2).

In operation S40, the compressed multimodal model and the pre-trained hypernetwork are jointly trained for optimization. Specifically, in operation S41, weights vectors in the vision transformer and the text transformer are fixed. In operation S42, the weights of the hypernetwork are updated based on a comparison between the number of parameters remaining after the model compression, and an initial number of parameters of the multimodal model, for example, using Equations (9)-(11).

Figure 6:
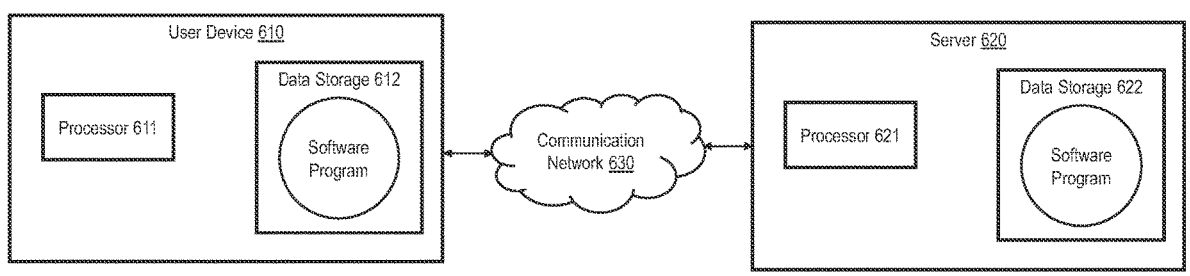
FIG. 6 is a diagram of devices for performing a multimodal task according to embodiments.

FIG. 6 is a diagram of devices for performing a multimodal task according to embodiments. FIG. 6 includes a user device 610, a server 620, and a communication network 630. The user device 610 and the server 620 may interconnect via wired connections, wireless connections, or a combination of wired and wireless connections.

The user device 610 includes one or more devices (e.g., a processor 611 and a data storage 612) configured to retrieve an image corresponding to a search query. For example, the user device 610 may include a computing device (e.g., a desktop computer, a laptop computer, a tablet computer, a handheld computer, a smart speaker, a server, etc.), a mobile phone (e.g., a smart phone, a radiotelephone, etc.), a camera device, a wearable device (e.g., a pair of smart glasses, a smart watch, etc.), a home appliance (e.g., a robot vacuum cleaner, a smart refrigerator, etc.), or a similar device. The data storage 612 of the user device 610 may include the multimodal search model 100. When the multimodal search model 100 is stored in the server 602 instead of the user device 610, the user device 610 may transmit an input query to the server 602, and may receive a response to the query from the server 602 which operates the multimodal search model 100.

The server 620 includes one or more devices (e.g., a processor 621 and a data storage 622) configured to train the multimodal search model 100 and the fine search model 200, and/or retrieve an image corresponding to a search query that is received from the user device 610. The data storage 622 of the server 620 may include the multimodal search model 100.

The communication network 630 includes one or more wired and/or wireless networks. For example, network 1300 may include a cellular network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 6 are provided as an example. In practice, there may be additional devices and/or networks, fewer devices and/or networks, different devices and/or networks, or differently arranged devices and/or networks than those shown in FIG. 6. Furthermore, two or more devices shown in FIG. 6 may be implemented within a single device, or a single device shown in FIG. 6 may be implemented as multiple, distributed devices. Additionally, or alternatively, a set of devices (e.g., one or more devices) may perform one or more functions described as being performed by another set of devices.

Figure 7:
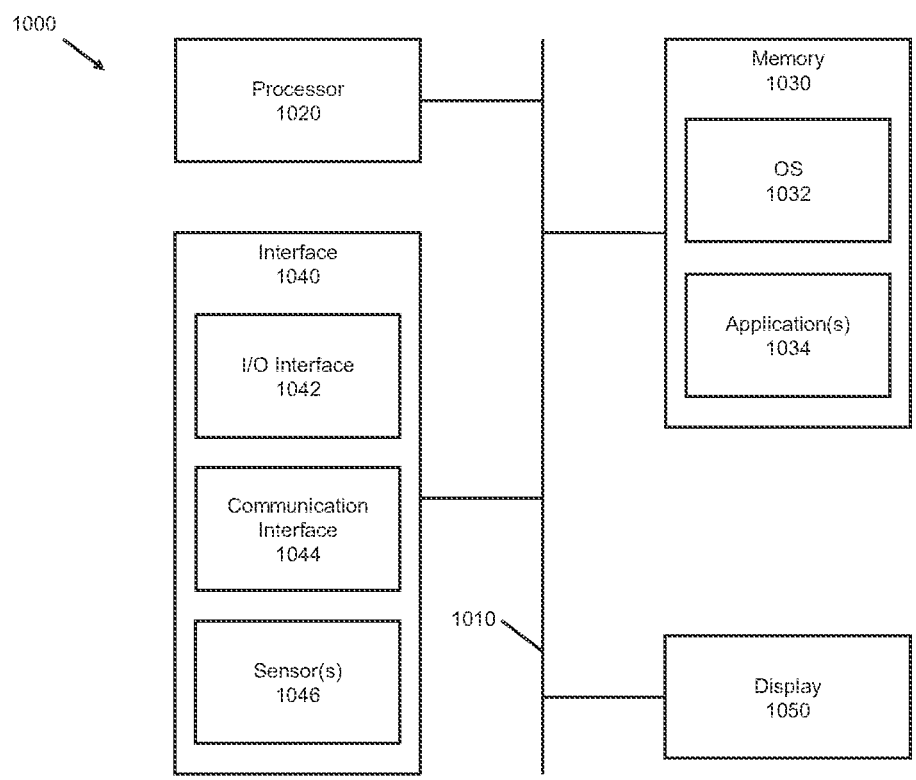
FIG. 7 is a diagram of components of one or more devices of FIG. 6 according to embodiments of the present disclosure.

FIG. 7 is a diagram of components of one or more electronic devices of FIG. 6 according to an embodiment. An electronic device 1000 in FIG. 7 may correspond to the user device 610 and/or the server 620.

FIG. 7 is for illustration only, and other embodiments of the electronic device 1000 could be used without departing from the scope of this disclosure. For example, the electronic device 1000 may correspond to a client device or a server.

The electronic device 1000 includes a bus 1010, a processor 1020, a memory 1030, an interface 1040, and a display 1050.

The bus 1010 includes a circuit for connecting the components 1020 to 1050 with one another. The bus 1010 functions as a communication system for transferring data between the components 1020 to 1050 or between electronic devices.

The processor 1020 includes one or more of a central processing unit (CPU), a graphics processor unit (GPU), an accelerated processing unit (APU), a many integrated core (MIC), a field-programmable gate array (FPGA), or a digital signal processor (DSP). The processor 1020 is able to perform control of any one or any combination of the other components of the electronic device 1000, and/or perform an operation or data processing relating to communication. For example, the processor 1020 may perform operations S10-S40 illustrated in FIG. 5. The processor 1020 executes one or more programs stored in the memory 1030.

The memory 1030 may include a volatile and/or non-volatile memory. The memory 1030 stores information, such as one or more of commands, data, programs (one or more instructions), applications 1034, etc., which are related to at least one other component of the electronic device 1000 and for driving and controlling the electronic device 1000. For example, commands and/or data may formulate an operating system (OS) 1032. Information stored in the memory 1030 may be executed by the processor 1020. In particular, the memory 1030 may store the multimodal search model 100 and a plurality of images.

The applications 1034 include the above-discussed embodiments. These functions can be performed by a single application or by multiple applications that each carry out one or more of these functions. For example, the applications 1034 may include an artificial intelligence (AI) model for performing operations S10-S40 illustrated in FIG. 5.

The display 1050 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 1050 can also be a depth-aware display, such as a multi-focal display. The display 1050 is able to present, for example, various contents, such as text, images, videos, icons, and symbols.

The interface 1040 includes input/output (I/O) interface 1042, communication interface 1044, and/or one or more sensors 1046. The I/O interface 1042 serves as an interface that can, for example, transfer commands and/or data between a user and/or other external devices and other component(s) of the electronic device 1000.

The communication interface 1044 may enable communication between the electronic device 1000 and other external devices, via a wired connection, a wireless connection, or a combination of wired and wireless connections. The communication interface 1044 may permit the electronic device 1000 to receive information from another device and/or provide information to another device. For example, the communication interface 1044 may include an Ethernet interface, an optical interface, a coaxial interface, an infrared interface, a radio frequency (RF) interface, a universal serial bus (USB) interface, a Wi-Fi interface, a cellular network interface, or the like. The communication interface 1044 may receive videos and/or video frames from an external device, such as a server.

The sensor(s) 1046 of the interface 1040 can meter a physical quantity or detect an activation state of the electronic device 1000 and convert metered or detected information into an electrical signal. For example, the sensor(s) 1046 can include one or more cameras or other imaging sensors for capturing images of scenes. The sensor(s) 1046 can also include any one or any combination of a microphone, a keyboard, a mouse, and one or more buttons for touch input. The sensor(s) 1046 can further include an inertial measurement unit. In addition, the sensor(s) 1046 can include a control circuit for controlling at least one of the sensors included herein. Any of these sensor(s) 1046 can be located within or coupled to the electronic device 1000. The sensor(s) 1046 may receive a text and/or a voice signal that contains one or more queries.

Figure 8:
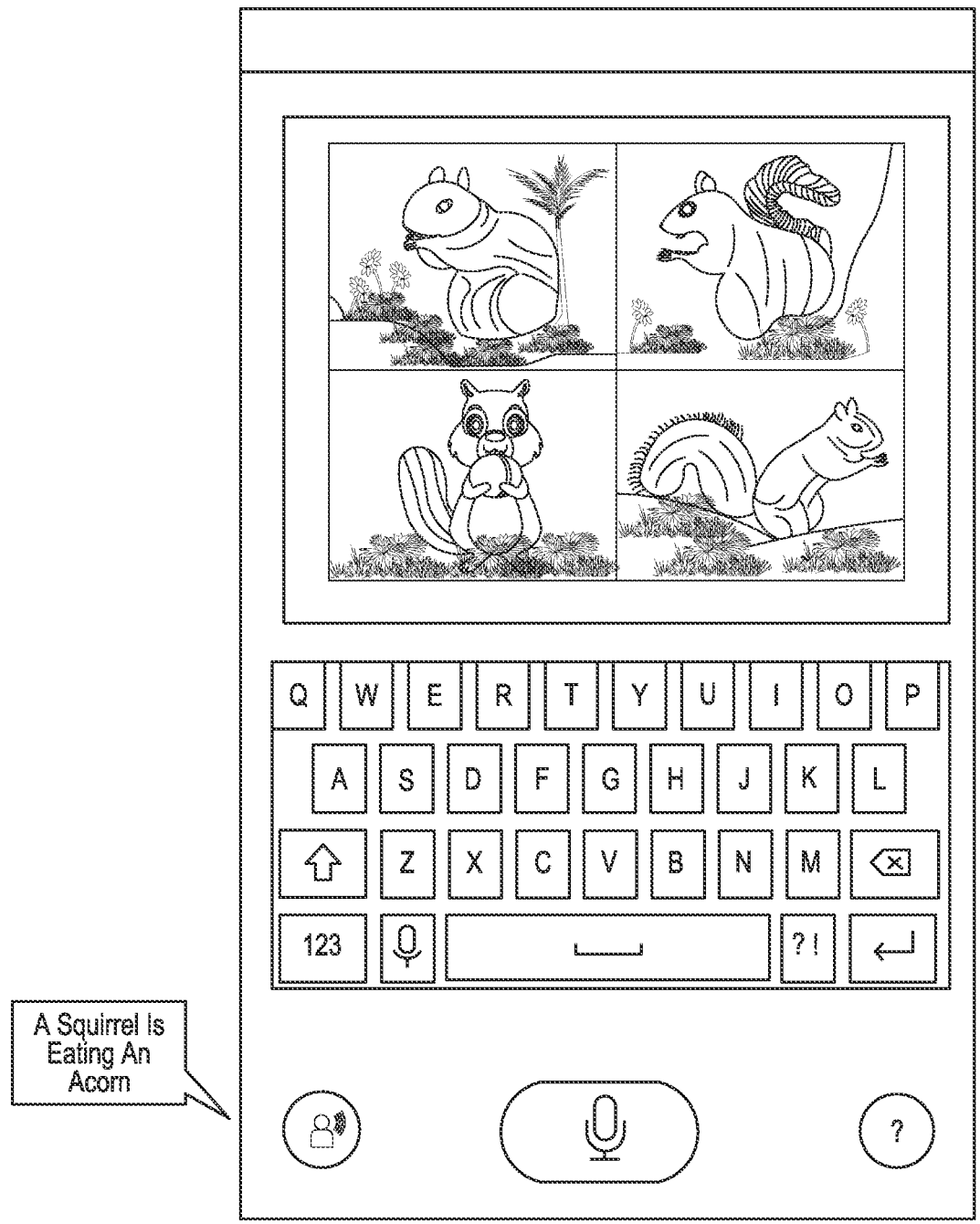
FIG. 8 illustrates an example of a task performance result according to embodiments of the present disclosure.

FIG. 8 illustrates an example of a task performance result according to embodiments of the present disclosure.

Referring to FIG. 8, a mobile device 2000 may receive a search query (e.g., "A squirrel is eating an acorn") via a microphone, a virtual keyboard, or a communication interface. The mobile device 2000 may input the search query and each of the images retrieved from a photo gallery of the mobile device 200 to a multimodal image retrieval model including the multimodal search model 100, and may output one or more images (e.g., image 1, image 2, image 3, and image 4) as a search result corresponding to the search query. The one or more images are displayed in the order of similarity between each of the images and the search query.

Figure 9:
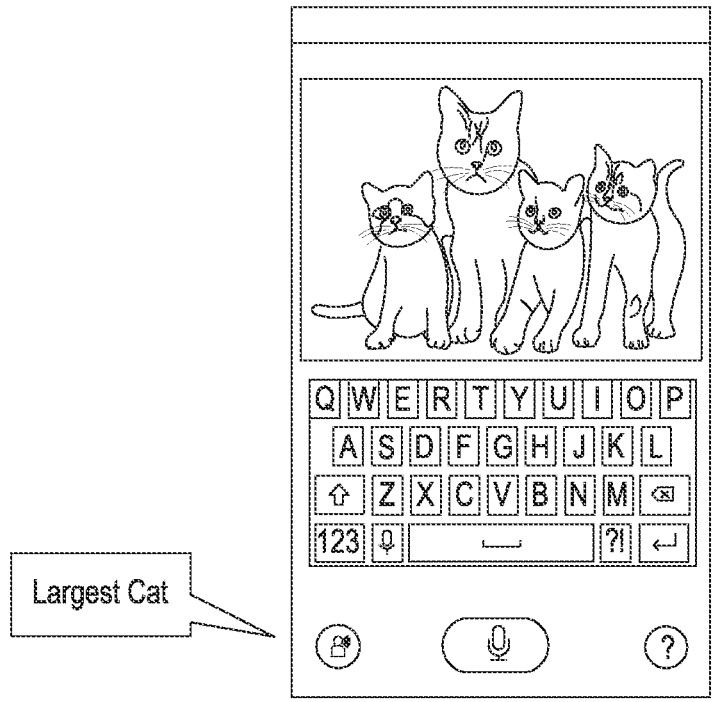
FIG. 9 illustrates an example of another task performance result according to embodiments of the present disclosure.
Figure 9:
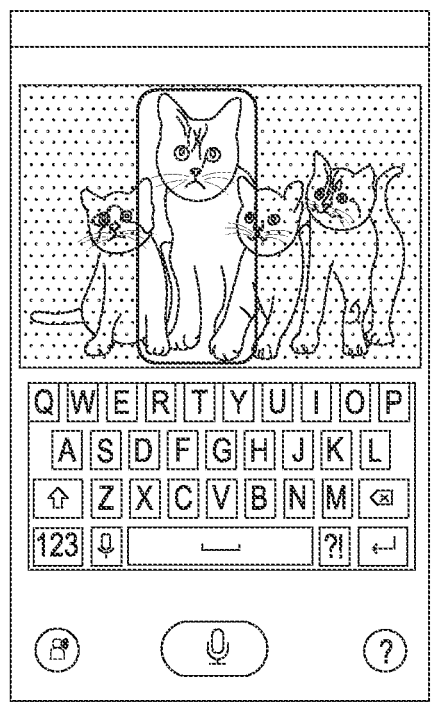

FIG. 9 illustrates an example of another task performance result according to embodiments of the present disclosure.

The mobile device 2000 may receive a search query (e.g., "the largest cat") via a microphone, a virtual keyboard, or a communication interface while an image (e.g., an image showing plural cats) is displayed on the mobile device 2000. The mobile device 2000 may input the search query and the image to a multimodal model including the multimodal search model 100, and may display a bounding box laid over the largest cat in the image, as a search result corresponding to the search query.

The multimodal model may be written as computer-executable programs or instructions that may be stored in a medium.

The medium may continuously store the computer-executable programs or instructions, or temporarily store the computer-executable programs or instructions for execution or downloading. Also, the medium may be any one of various recording media or storage media in which a single piece or plurality of pieces of hardware are combined, and the medium is not limited to a medium directly connected to electronic device 100, but may be distributed on a network. Examples of the medium include magnetic media, such as a hard disk, a floppy disk, and a magnetic tape, optical recording media, such as CD-ROM and DVD, magneto-optical media such as a floptical disk, and ROM, RAM, and a flash memory, which are configured to store program instructions. Other examples of the medium include recording media and storage media managed by application stores distributing applications or by websites, servers, and the like supplying or distributing other various types of software.

The multimodal model may be provided in a form of downloadable software. A computer program product may include a product (for example, a downloadable application) in a form of a software program electronically distributed through a manufacturer or an electronic market. For electronic distribution, at least a part of the software program may be stored in a storage medium or may be temporarily generated. In this case, the storage medium may be a server or a storage medium of server 106.

The foregoing disclosure provides illustration and description, but is not intended to be exhaustive or to limit the implementation to the precise form disclosed. Modifications and variations are possible in light of the above disclosure or may be acquired from practice of the implementation.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

A model related to the neural networks described above may be implemented via a software module. When the model is implemented via a software module (for example, a program module including instructions), the model may be stored in a computer-readable recording medium.

Also, the model may be a part of the electronic device 1000 described above by being integrated in a form of a hardware chip. For example, the model may be manufactured in a form of a dedicated hardware chip for artificial intelligence, or may be manufactured as a part of an existing general-purpose processor (for example, a CPU or application processor) or a graphic-dedicated processor (for example a GPU).

Also, the model may be provided in a form of downloadable software. A computer program product may include a product (for example, a downloadable application) in a form of a software program electronically distributed through a manufacturer or an electronic market. For electronic distribution, at least a part of the software program may be stored in a storage medium or may be temporarily generated. In this case, the storage medium may be a server of the manufacturer or electronic market, or a storage medium of a relay server.

While the embodiments of the disclosure have been described with reference to the figures, it will be understood by those of ordinary skill in the art that various changes in form and details may be made therein without departing from the spirit and scope as defined by the following claims.

What is claimed is:

1. An electronic device for operating a multimodal model that comprises a text encoder and a vision encoder, the electronic device comprising:
   a user interface configured to receive a query; and
   one or more processors configured to:
      obtain one or more input images;
      obtain a text feature by inputting the query to the text encoder;
      obtain an image feature by inputting the one or more input images to the vision encoder;
      output a response to the query based on similarity between the text feature and the image feature, and
      compress the multimodal model by pruning weights vectors of the text encoder and the vision encoder based on a pruning vector that are-generated by a hypernetwork and by sharing the weights vectors of the text encoder and the vision encoder based on a sharing vector generated by the hypernetwork, and
   wherein the hypernetwork and the multimodal model are jointly trained to minimize at least one of a difference between the weight vectors in the text encoder and the vision encoder, a difference between the weight vectors in different layers of the text encoder, and a number of parameters in the multimodal model.

2. The electronic device of claim 1, wherein any one or any combination of the one or more processors are configured to: to perform weight sharing and weight pruning on multi-head self-attention layers of the text encoder and the vision encoder.

3. The electronic device of claim 2, the weight sharing comprises either one or both of cross-modal weight sharing between the text encoder and the vision encoder, and block-wise sharing that is performed within a block including a plurality of layers of the text encoder.

4. The electronic device of claim 1, wherein any one or any combination of the one or more processors are configured to: to perform weight sharing and weight pruning on feedforward network layers of the text encoder and the vision encoder.

5. The electronic device of claim 4, the weight sharing comprises either one or both of cross-modal weight sharing between the text encoder and the vision encoder, and block-wise sharing that is performed within a block including a plurality of layers of the text encode.

6. The electronic device of claim 1, wherein the hypernetwork is trained to generate the sharing vector and the pruning vector such that a same weight vector is not both pruned and shared.

7. The electronic device of claim 6, wherein, when the weights vectors of the text encoder and the vision encoder are pruned and shared, weight sharing is prioritized over weight pruning.

8. The electronic device of claim 1, wherein the hypernetwork and the multimodal model are jointly trained by:
after the weight vectors in the vision encoder and the text encoder are pruned and shared, freezing the weight vectors in the vision encoder and the text encoder, and then updating weights in the hypernetwork based on a comparison between an initial number of parameters in the multimodal model, and a number of parameters remaining in the multimodal model after weight sharing and weight pruning.

9. The electronic device of claim 1, wherein based on the query requiring identifying a target image from the one or more input images, any one or combination of the one or more processors are further configured to:
select an image having a greatest similarity with the text feature or having a similarity with the text feature that exceeds a predetermined similarity threshold, among the one or more input images, and
provide the selected image as the response to the query.

10. The electronic device of claim 1, wherein based on the query requiring identifying a target object from a specific image among the one or more images, any one or combination of the one or more processors are further configured to:
identify an object having a greatest similarity with the text feature or having a similarity with the text feature that exceeds a predetermined similarity threshold, among the one or more input images, and
visually indicate the identified object within the specific image, as the response to the query.

11. A method of performing a multimodal tasks by using a multimodal model that comprises a text encoder and a vision encoder, the method comprising:
obtaining a text feature from a query by inputting the query to the text encoder;
obtaining an image feature from one or more input images by inputting the one or more input images to the vision encoder;
outputting a response to the query based on similarity between the text feature and the image feature; and
compressing the multimodal model by pruning weights vectors of the text encoder and the vision encoder based on a pruning vector generated by a hypernetwork and by sharing the weights vectors of the text encoder and the vision encoder based on a sharing vector generated by the hypernetwork, and
wherein the hypernetwork and the multimodal model are jointly trained to minimize at least one of a difference between the weight vectors in the text encoder and the vision encoder, a difference between the weight vectors in different layers of the text encoder, and a number of parameters in the multimodal model.

12. The method of claim 11, further comprising performing weight sharing and weight pruning on multi-head self-attention layers of the vision encoder and the text encoder.

13. The method of claim 12, the weight sharing comprises either one or both of cross-modal weight sharing between the text encoder and the vision encoder, and block-wise sharing that is performed within a block including a plurality of layers of the text encoder.

14. The method of claim 11, further comprising performing weight sharing and weight pruning on feedforward network layers of the vision encoder and the text encoder.

15. The method of claim 14, the weight sharing comprises either one or both of cross-modal weight sharing between the text encoder and the vision encoder, and block-wise sharing that is performed within a block including a plurality of layers of the text encoder.

16. The method of claim 11, wherein the hypernetwork is trained to generate the sharing vector and the pruning vector such that a same weight vector is not both pruned and shared.

17. The method of claim 16, wherein, when the weights vectors of the text encoder are pruned and shared, weight sharing is prioritized over weight pruning.

18. The method of claim 11, wherein the hypernetwork and the multimodal model are jointly trained by:
after the weight vectors in the vision encoder and the text encoder are pruned and shared, freezing the weight vectors in the vision encoder and the text encoder, and then updating weights in the hypernetwork based on a comparison between an initial number of parameters in the multimodal model, and a number of parameters remaining in the multimodal model after weight sharing and weight pruning.

19. The method of claim 11, wherein based on the query requiring identifying a target image from the one or more input images, the outputting of the response to the query comprises:
selecting an image having a greatest similarity with the text feature or having a similarity with the text feature that exceeds a predetermined similarity threshold, among the one or more input images, and
providing the selected image as the response to the query.

20. A non-transitory computer-readable storage medium storing a program that is executable by at least one processor to perform a method of performing a multimodal tasks by using a multimodal model that comprises a text encoder and a vision encoder, the method comprising:
obtaining a text feature from a query by inputting the query to the text encoder;

obtaining an image feature from one or more input images by inputting the one or more input images to the vision encoder; and outputting a response to the query based on similarity between the text feature and the image feature; and compressing the multimodal model by pruning weights vectors of the text encoder and the vision encoder based on a pruning vector generated by a hypernetwork and by sharing the weights vectors of the text encoder and the vision encoder based on a sharing vector generated by the hypernetwork, and wherein the hypernetwork and the multimodal model are jointly trained to minimize at least one of a difference between the weight vectors in the text encoder and the vision encoder, a difference between the weight vectors in different layers of the text encoder, and a number of parameters in the multimodal model.

\* \* \* \* \*